United States Patent
Tsao et al.

(10) Patent No.: US 9,898,216 B2
(45) Date of Patent: Feb. 20, 2018

(54) DATA STORAGE SYSTEM AND SPECIFIC COMMAND EXECUTION METHOD THEREOF

(71) Applicant: ACCELSTOR, INC., New Taipei (TW)

(72) Inventors: Shih-Chiang Tsao, New Taipei (TW); Ting-Fang Chien, New Taipei (TW); An-Nan Chang, New Taipei (TW); Hann-Huei Chiou, New Taipei (TW)

(73) Assignee: Accelstor, Inc., New Taipei (TW)

(*) Notice: Subject to any disclaimer, the term of this patent is extended or adjusted under 35 U.S.C. 154(b) by 111 days.

(21) Appl. No.: 14/966,142

(22) Filed: Dec. 11, 2015

(65) Prior Publication Data

US 2016/0357461 A1    Dec. 8, 2016

(30) Foreign Application Priority Data

Jun. 4, 2015   (TW) .............................. 104118116 A

(51) Int. Cl.
*G06F 3/06*    (2006.01)

(52) U.S. Cl.
CPC .......... *G06F 3/0619* (2013.01); *G06F 3/0644* (2013.01); *G06F 3/0659* (2013.01); *G06F 3/0665* (2013.01); *G06F 3/0689* (2013.01)

(58) Field of Classification Search
CPC .. G06F 3/0619; G06F 3/0659; G06F 11/1076; G06F 3/0665; G06F 3/0688; G06F 3/0676; G06F 11/1092; G06F 12/0292; G06F 3/065; G06F 3/0689; G06F 3/0644
See application file for complete search history.

(56) References Cited

U.S. PATENT DOCUMENTS

| 6,611,907 B1* | 8/2003 | Maeda ................. G06F 3/0613 711/103 |
| 8,291,194 B2* | 10/2012 | Tsai ..................... G06F 3/0608 711/103 |
| 2010/0122021 A1* | 5/2010 | Lee ..................... G06F 3/0613 711/103 |
| 2013/0117632 A1* | 5/2013 | Fujinami ............. G06F 11/1012 714/763 |
| 2014/0215125 A1* | 7/2014 | Sela ..................... G06F 12/0246 711/103 |
| 2014/0281588 A1* | 9/2014 | Vogan .................... G06F 21/79 713/193 |
| 2016/0004642 A1* | 1/2016 | Sugimoto .............. G06F 3/06 711/128 |

* cited by examiner

*Primary Examiner* — Hashem Farrokh
(74) *Attorney, Agent, or Firm* — Rosenberg, Klein & Lee

(57) ABSTRACT

The present invention relates to a data storage system and specific command execution method thereof, which is applied to a memory storage system. When a memory manager receives an command from a host system, it can judge whether the command is a normal command or a specific command. If the command is the specific command, read a first logic sector address, an accessible data length and a second logic sector address in the specific command, and duplicate the first logic sector address pointing to the physical storage address of the stored data reading to a memory buffer; and move physical storage address pointing to that from the first logic sector address to the second logic sector address. It can achieve both data reading and data moving by one specific command.

10 Claims, 5 Drawing Sheets

DATA STORAGE SYSTEM AND SPECIFIC COMMAND EXECUTION METHOD THEREOF

FIELD OF THE INVENTION

The present invention relates to a data storage system and specific command execution method thereof, which can be applied to data storage devices such as non-volatile memory, solid state disk, USB flash drive or RAID.

BACKGROUND OF THE INVENTION

The non-volatile memory takes advantage of the non-mechanical structure, small size, low noise, anti-vibration, low power consumption and fast read and write speed. Therefore, it is applied to various data storage devices, such as solid state disk (SSD), USB flash drive or RAID (Redundant Array of Independent Drives).

According to these characteristics of the non-volatile memory, a physical block comprises a plurality of physical pages. When a host system (such as host computer) communicates a data write memory, it takes a physical page or a smaller sector as a unit to write sequentially. The physical page stored a data must execute an erasing program first, then writing other data, and the smallest unit of the erasing program is a physical block. The non-volatile memory has write or erase limits of life-time so that if the non-volatile memory exceeds the upper limit of write or erase times, it will reduce the operating speed, cause damage and cause the entire memory damage.

Referring to FIG. 1, the data storage system 10 having the physical storage memory 15 includes a memory manager 19, which can transfer the logic sector address 11 (Logical Sector Address; LSA) communicated or saved by the host system 20 to a logic block and a logic page, and the logic block and logic page are corresponded pointing to a physical block and a physical page of the physical storage memory 15, and the physical page has a physical storage address 13. The mapping relation between logic sector address 11 and physical storage address 13 is recorded in a logic-physical address mapping table 17.

When the host system 20 moves the stored data from a (first) logic sector address L_1 to another (second) logic sector address L_4, the host system 20 must deliver a normal command 291, such as a move command, to the memory manager 19. And the host system 20 and/or memory manager 19 perform the followings: (a) Read and duplicate the first logic sector address L_1 corresponding and pointing to the stored data D_A (stored in the physical storage memory (B1, P0)) to a memory buffer 25; (b) Write the stored data D_A temporarily stored in the memory buffer 25 to another physical storage memory (B0, P2) which the second logic sector address L_4 pointing to; and (c) Delete or set the stored data (D_A) of the logic sector address L_1 invalid.

The program is more complicated for the same data moving command in a disc array system having parity bit check (parity) function, such as RAID4, RAID5 or RAID6. When the host system 20 moves a stored data from a logic sector address L_A to another logic sector address L_B, the host system 20 and/or memory manager 19 will control and perform the followings: (a) Read the stored data D_A stored in a physical storage address, which the logic sector address L_A pointed, to the memory buffer 25; (b) Read the parity bit check block data P_A of the data stripe S_A of RAID, which is corresponding to the logic sector address L_A, to the memory buffer 25; (c) Read the stored data D_B stored in the physical storage address, which the logic sector address L_B pointed, to memory buffer 25; (d) Read the parity bit check block data P_B of the data stripe S_B of RAID, which is corresponding to the logic sector address L_B, to the memory buffer 25; (e) Calculate (such as XOR operation) the new parity bit check block data P_A2 of the logic sector address L_A by the stored data D_A, parity bit check block data P_A and a blank data; (f) Calculate (such as XOR operation) the new parity bit check block data P_B2 of the logic sector address L_B by the stored data D_B, parity bit check block data P_B and the stored data D_A; (g) Write the stored data D_A temporarily stored in memory buffer 25 to the logic sector address L_B; (h) Write new parity bit check data P_B2 temporarily stored in memory buffer 25 to the parity bit check block of the data stripe S_B of RAID; (i) Delete or set the stored data D_A of the logic sector address L_A invalid; and (j) Write the new parity bit check data P_A2 temporarily stored in memory buffer 25 to the parity bit check block of the data stripe S_A of RAID.

Although conventional data storage system 10 can execute read, write, delete and/or move commands, but each command must be transmitted respectively. If the user wants to check the moved storage data in the step of data moving, it must transmit two commands of reading and moving respectively. After conventional moving command, the data storage system 10 must perform various actions of reading and moving so that it will possible to improve the lifetime or efficiency of data storage system 10.

SUMMARY OF THE INVENTION

The present invention provides a data storage system and specific command execution method thereof, and the specific command can execute reading and moving of data at the same time. It can not only reduce the writing times and the input/output delay (IO Latency) of physical storage memory, but also improve the efficiency and lifetime of the data storage system.

The present invention provides a data storage system and specific command execution method thereof, and the specific command is applied to RAID with the function of parity bit check. It can not only reduce the command transmitting times and data writing times, but also improve the efficiency of data parity bit check of RAID.

In order to achieve the above object, the present invention provides a data storage system comprising: at least one physical storage memory, each physical storage memory is divided into a plurality of physical storage units, and each physical storage unit has a physical storage address, within part of the physical storage units store a stored data; a plurality of logic sector addresses, part of the logic sector addresses are pointing to correspondingly one of the physical storage addresses by a logic-physical address mapping table; and a memory manager, electrically connecting to a host system, the physical storage memory and the logic sector address can receive a normal command, a specific command or a normal command and a specific command from the host system, and the specific command comprises a first logic sector address, an accessible data length and a second logic sector address; wherein, the memory manager can read and duplicate the stored data corresponding to the first logic sector address and stored in a first physical storage address, which is the accessible data length pointing to, to a memory buffer according to the specific command, and move the physical storage address originally pointing to the first logic sector address to point to the second logic sector address.

In a preferred embodiment of the invention, wherein the move of stored data to the second logic sector address is by the memory manager modifying the logic-physical address mapping table, and the logic sector address, which is the physical storage address of the stored data pointing to, is modified as the second logic sector address from the first logic sector address.

In a preferred embodiment of the invention, wherein the normal command comprises a read command, which comprises an accessible data starting address and the accessible data length, and the specific command is to modify the accessible data starting address as a combination of a specific command identification code, the first logic sector address and the second logic sector address.

In a preferred embodiment of the invention, wherein the normal command comprises a read command having an accessible data starting address and the accessible data length, and the specific command is to modify the accessible data starting address as a combination of a specific command identification code and the first logic sector address, and the second logic sector address in the specific command is stored in the memory buffer.

In a preferred embodiment of the invention, wherein the specific command is a vendor specific command having the first logic sector address, the accessible data length and the second logic sector address.

In a preferred embodiment of the invention, wherein the memory buffer is disposed in the data storage system or the host system.

In order to achieve the above object, the present invention provides a specific command execution method, which is applied to a data storage system, the data storage system comprises at least one physical storage memory, a plurality of logic sector addresses and a memory manager, the physical storage memory is divided into a plurality of physical storage units, and each physical storage unit has a physical storage address, part of the physical storage units store a stored data, part of the logic sector addresses are pointing to correspondingly one of the physical storage addresses by a logic-physical address mapping table, and the memory manager respectively electrically connects to the physical storage memory and logic sector address, the specific command execution method comprising: the memory manager is received an command to judge whether the command is a normal command or a specific command; if the command is the specific command, read a first logic sector address, an accessible data length and a second logic sector address in the specific command, reading and duplicating the stored data of the physical storage address, which the first logic sector address is pointing to, to a memory buffer; and moving the physical storage address originally pointing to the first logic sector address to the second logic sector address.

In order to achieve the above object, the present invention provides a specific command execution method, which is applied to a RAID (Redundant Array of Independent Drives) system, the RAID system is a log mode or a copy-on-write mode, the RAID system comprises at least one physical storage memory, a plurality of logic sector addresses and a memory manager, the physical storage memory is divided into a plurality of physical storage units, and each physical storage unit has a physical storage address, part of the physical storage units store a stored data, part of the logic sector addresses are pointing to correspondingly one of the physical storage addresses by a logic-physical address mapping table, and the memory manager respectively electrically connects to the physical storage memory and logic sector address, the specific command execution method comprising: the memory manager is received an command to judge whether the command is a normal command or a specific command; if the command is the specific command, read a first logic sector address, an accessible data length and a second logic sector address in the specific command, reading and duplicating the stored data of the physical storage address, which the first logic sector address is pointing to, to a memory buffer; moving the physical storage address originally pointing to the first logic sector address to the second logic sector address; reading a second parity bit check block data of a second RAID data stripe corresponding to the second logic sector address to the memory buffer; calculating a second new parity bit check block data of the second logic sector address by a blank data, the second parity bit check block data and the stored data; and writing the second new parity bit check block data to the second parity bit check block of the second RAID data stripe.

The following embodiments will be described in detail in the above description and the technical solution of this disclosure.

DETAILED DESCRIPTION OF THE PREFERRED EMBODIMENTS

Figure 1:
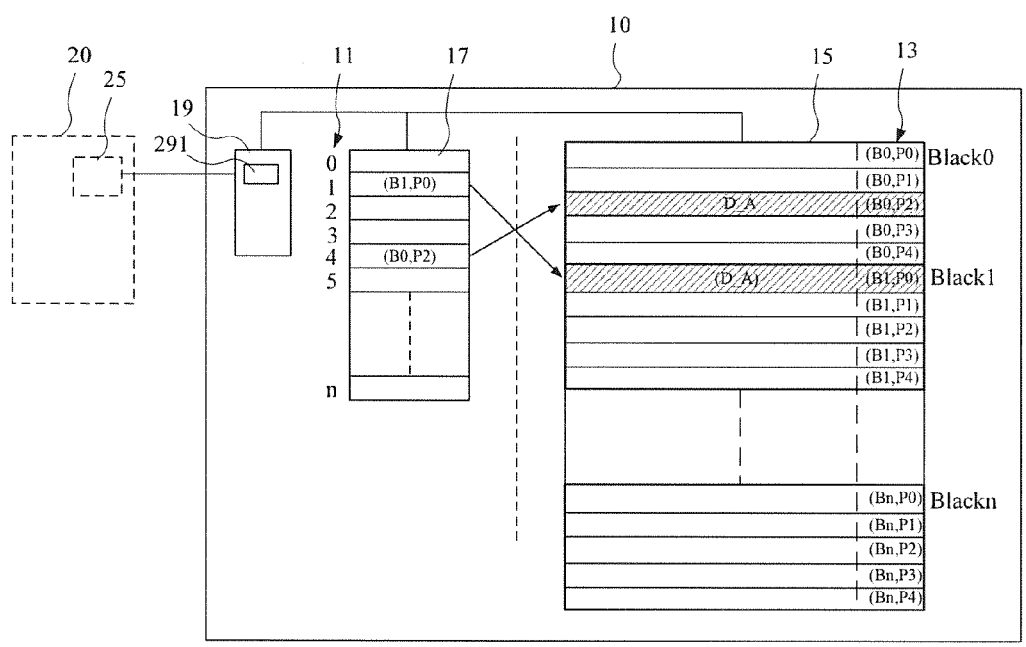
FIG. 1 is a schematic view of a conventional data storage system and a host system.
Figure 2:
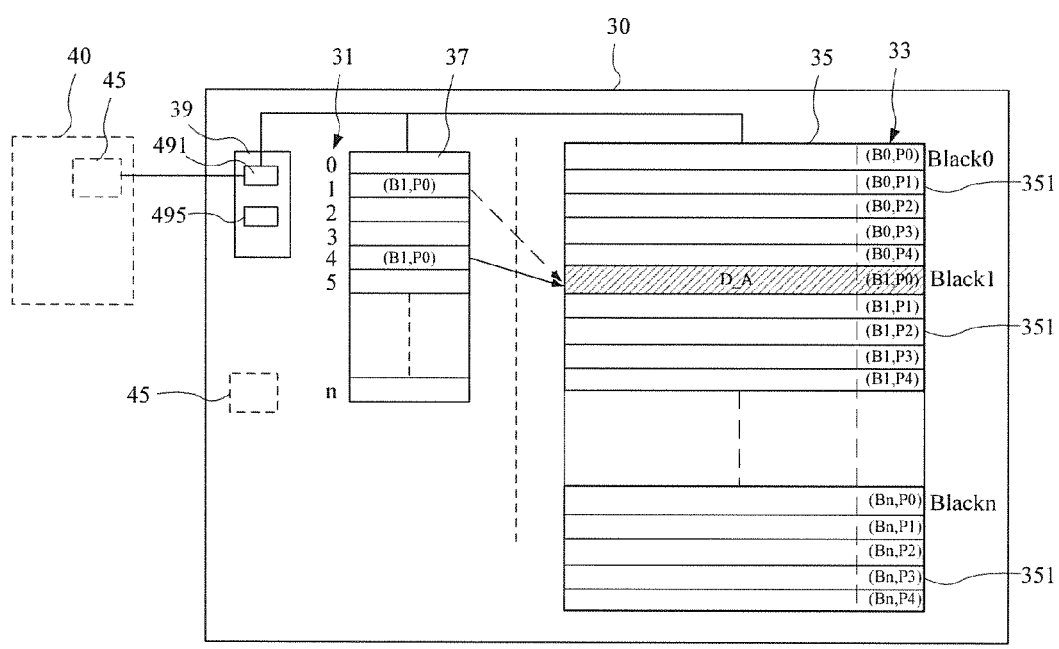
FIG. 2 is a schematic view of a data storage system of the present invention and a host system.

This disclosure will become more fully understood from the detailed description given herein below for illustration only, and thus not limitative of this disclosure, wherein:

Referring to FIG. 2, there is shown a schematic view of a data storage system of the present invention and a host system. As shown in the figure, the present invention is applied to a data storage device, such as solid state disk (SSD), flash drive or RAID (Redundant Array of Independent Drives). A data storage system 30 having a physical storage memory 35 (non-volatile memory) includes a memory manager 39 electrically connecting to a host system 40 and at least one physical storage memory 35. The physical storage memory 35 can transfer the logic sector address 31 (Logical Sector Address; LSA), which can be communicated or saved by host system 40, to a logic block and a logic page. And the logic block and logic page are corresponded pointed to the physical block and the physical page of the physical storage memory 35. The physical page can be a physical storage unit 351 that each physical storage unit 351 has a physical storage address 33 (Physical Address). The mapping relation between the logic sector address 31 and the physical storage address 33 are recorded in a logic-physical address mapping table 37. The memory manager 39 can connect and manage the logic sector address 31, physical storage address 33, physical storage memory 35 and logic-physical address mapping table 37. A memory buffer 45 is disposed in the host system 40 and/or the data storage system 30, which connects memory manager 39.

The present invention is mainly to create a novel specific command 495, especially for a read-move command. In response to users' requirements, the host system 40 can transmit at least one normal command 491 and/or a specific command 495 to the data storage system 30, and normal command 491 and/or specific command 495 are delivered to memory manager 39. According to received commands, memory manager 39 controls data storage system 30 to execute normal command programs such as commands of read, write, delete or move and automatically execute specific command programs such as commands of read and move.

Figure 3:
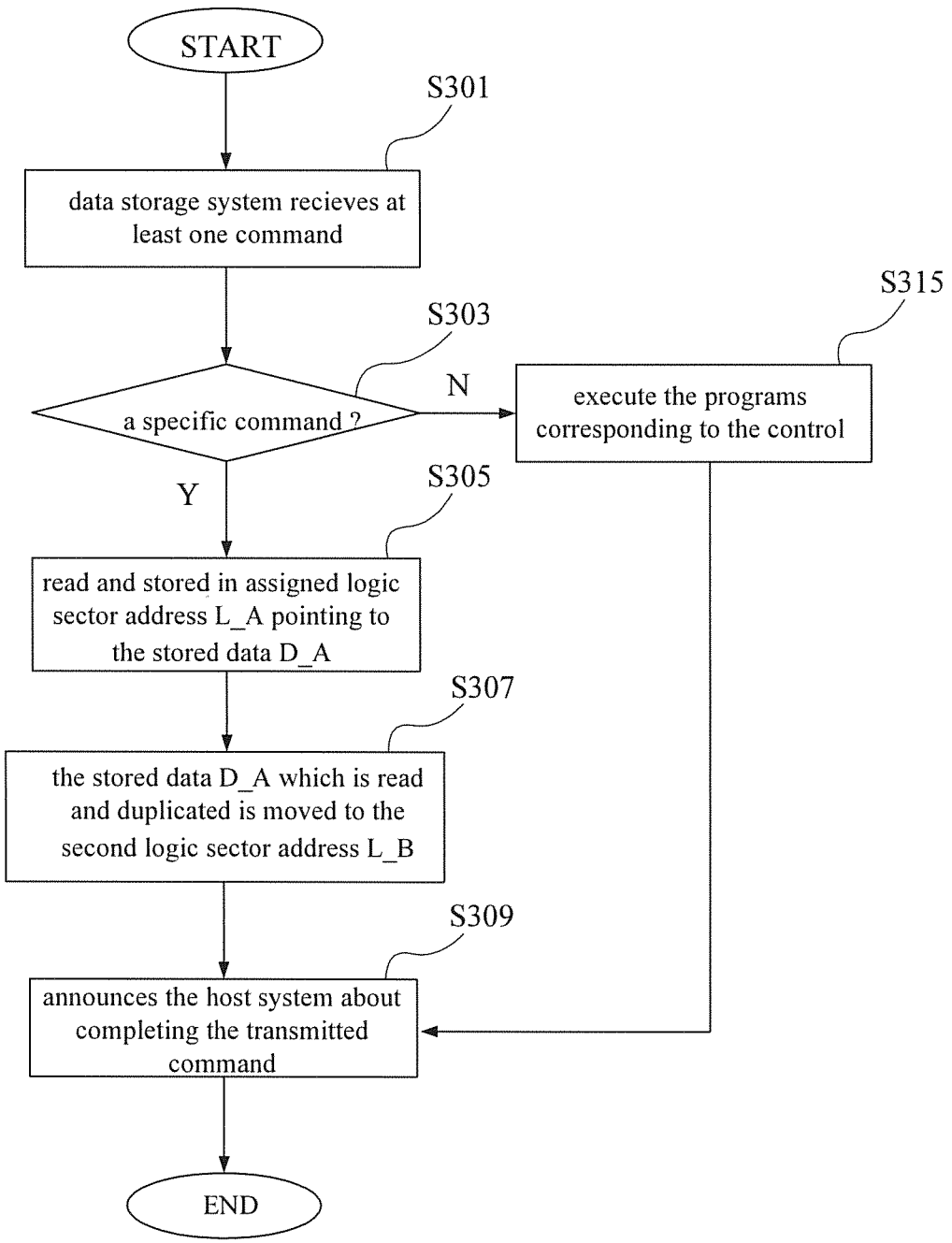
FIG. 3 is a flowchart of commands executed by the data storage system of the present invention in one embodiment.

Referring to FIG. 3, there is shown a flowchart of commands executed by the data storage system of the present invention in one embodiment. Also referring to FIG. 2, the host system 40 transmits at least one command, delivering to the memory manager 39 of data storage system 30 in step S301. The memory manager 39 determines whether the transmitted command is a specific command 495 in step S303. If the transmitted command is the specific command 495, then proceed to step S305. And, if the transmitted command is the normal command 491 rather than the specific command 495, then proceed to step S315.

In step S305, the received command is a specific command 495 involving a process of reading-moving. By host system 40 and/or memory manager 39, it can read and stored in assigned (first one) logic sector address L_A pointing to the stored data D_A (stored in the physical storage unit (B1, P40).

In step S307, the stored data D_A which is read and duplicated in the memory buffer 45 is moved to new (second) logic sector address L_B. In other words, the new logic sector address L_B can point to the physical storage address (B1, P0) originally storing the stored data D_A.

In step S309, the memory manager 39 announces the host system 40 about completing the transmitted command.

In step S315, the delivered command by host system 40 is a normal command such as control, read, write, delete or move command. The host system 40 and/or the memory manager 39 can control the data storage system 30 to execute the programs corresponding to the control, read, write, delete or move commands. Generally, the control, read, write, delete or move commands are normal memory programs, are not discussed here.

Figure 4:
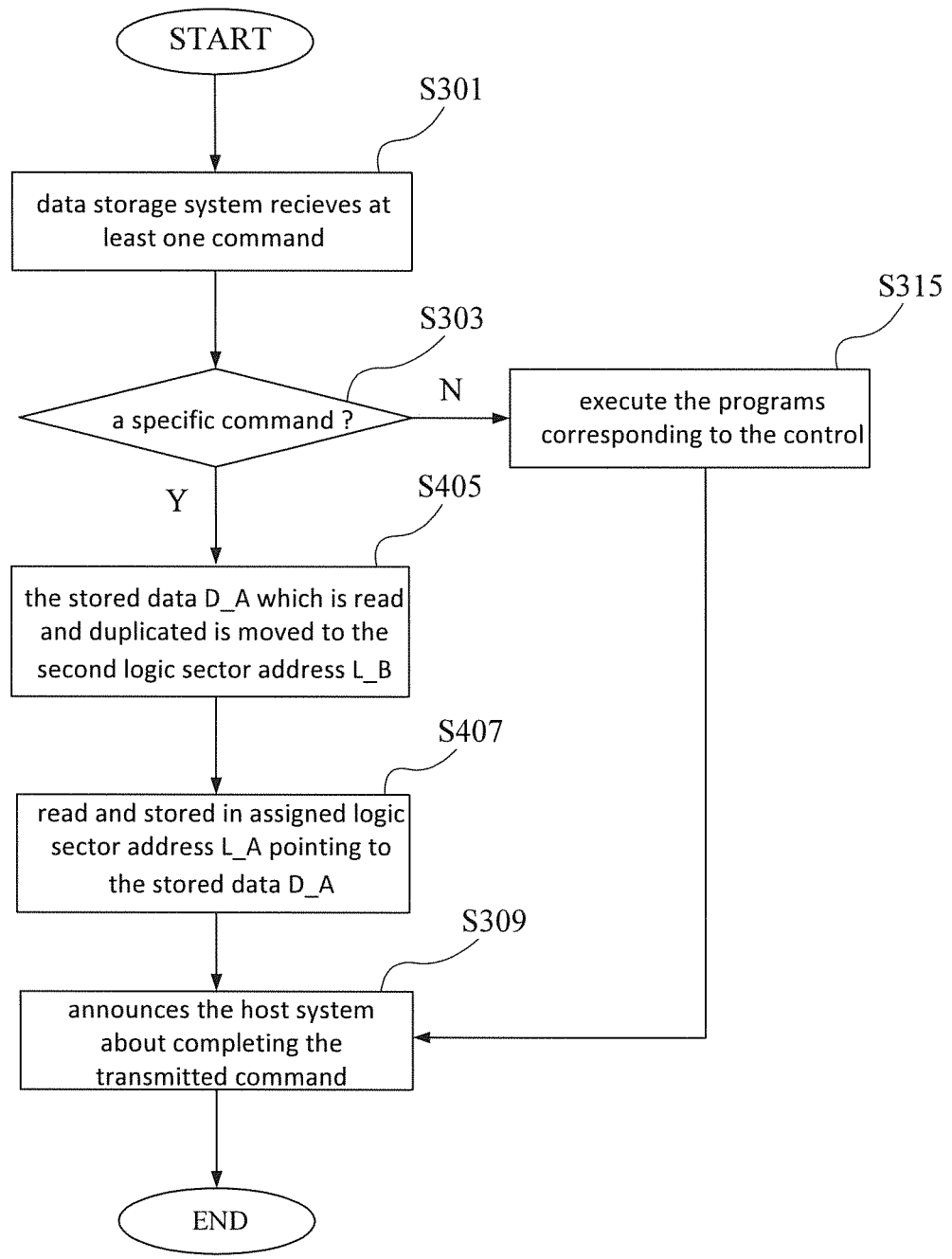
FIG. 4 is a flowchart of commands executed by the data storage system of the present invention in another embodiment.

Referring to FIG. 4, there is shown a flowchart of commands executed by the data storage system of the present invention in another embodiment. Referring to FIG. 3, the difference is to reverse the sequence of step S305 and step S307 compared by the present embodiment. The specific command 495 of the present invention can automatically execute data reading and data moving, and does not transmit both data reading and data moving commands respectively. It does not matter whether data reading or data moving is executed first. In this embodiment, after step S303, it moves the accessible stored data D_A to the new logic sector address L_B in step S405. In other words, the new logic sector address L_B can be pointed to the original physical storage address (B1, P0) of the stored data D_A. In step S407, it reads the accessible stored data DA and duplicates it to memory buffer 25.

Although, it only discloses a physical storage memory 35 in FIG. 2, but the present invention can be applied to a plurality of physical storage memory 35 such as the RAID system at the same time.

Figure 5:
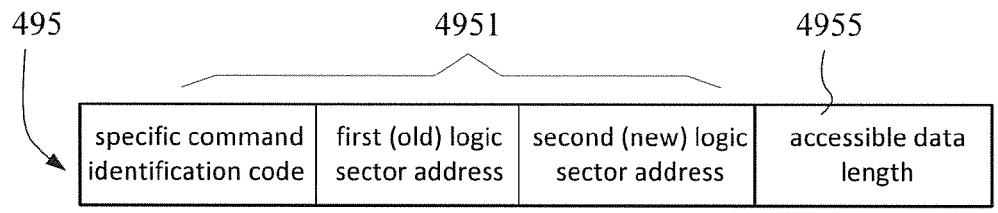
FIG. 5 is a schematic view of a specific command of the present invention in one embodiment.

The purpose of the present invention is to define a specific command 495, which can automatically execute data reading and data moving. Therefore, it is important for data storage system 30 to judge if the received command is a specific command 495 or a normal command 491. As shown in FIG. 5, it can modify the starting address of read command as a specific command in one embodiment of the present invention. Generally, the read command includes an accessible data starting address (4951) and an accessible data length 4955. A specific command identification code (signature), a first (old) logic sector address (L_A) and a second (new) logic sector (L_B) address can be series connected and filled in originally accessible data starting address 4951, which further connect originally accessible data length 4955 to represent a specific command 495. In other words, the specific command 495 includes the specific command identification code, the first logic sector address (L_A), the second logic sector address (L_B) and the accessible data length 4955. After the data storage system 30 receiving the command transmitted by host system 40, it is first to check whether accessible data starting address 4951 has a specific command identification code or not. If the accessible data starting address 4951 has the specific command identification code, a specific command 495 is allowed to execute data reading and data moving. The first logic sector address (L_A) and the accessible data length 4955 pointing to the stored data (D_A) stored in physical storage unit 351 are read and duplicated to memory buffer 45, and the stored data D_A in the physical storage address (B1, P0) is moved for pointing to the second logic sector address (L_B).

Figure 6:
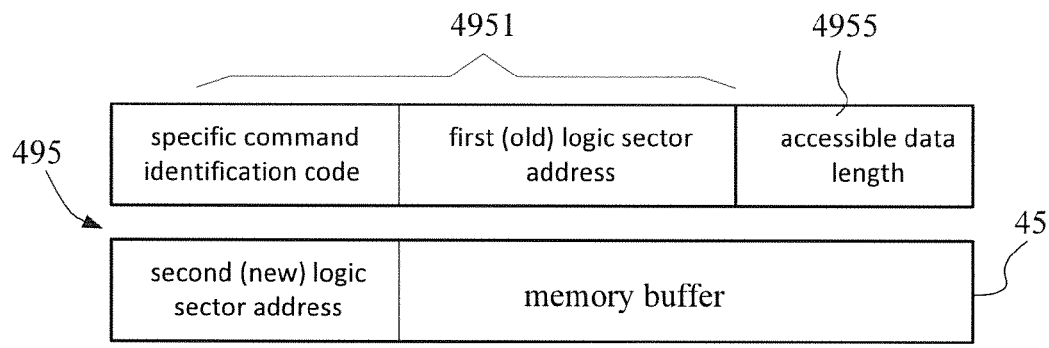
FIG. 6 is a schematic view of a specific command of the present invention in another embodiment.

Also referring to FIG. 6, there is shown a schematic view of a specific command in another embodiment of the present invention. In this embodiment, it can modify the accessible data starting address 4951 of a read command and utilize a part of memory buffer 45 to be as a specific command 495. A specific command identification code (signature) and a first old logic sector address (L_A) can be series connected and filled in the accessible data starting address 4951 of an original read command, and the (second) new logic sector address (L_B) can be filled in an assigned location (such as the first address) of the memory buffer 45, which further connect represent a specific command 495. In other words, the specific command 495 includes the specific command identification code, the first logic sector address (L_A) and the accessible data length 4955, and the second logic sector address (L_B) is additionally set in the memory buffer 45. After the data storage system 30 receiving the command transmitted by the host system 40, it is first to check whether the accessible data starting address 4951 has the specific command identification code or not? If the accessible data starting address 4951 has the specific command identification code, a specific command 495 is allowed to execute data reading and data moving. The first logic sector address (L_A) and the accessible data length 4955 pointing to the stored data (D_A) stored in the physical storage unit 351 are read and duplicated to the memory buffer 45, and the physical storage address (B1, P0) with the stored data D_A is moved for pointing to the second logic sector address (L_B).

Figure 7:
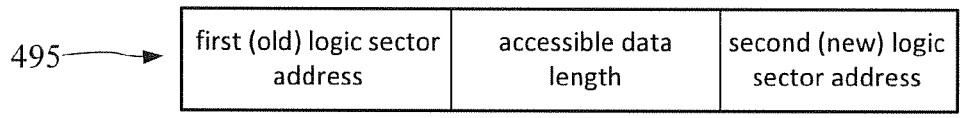
FIG. 7 is a schematic view of a specific command of the present invention in another embodiment.

Also referring to FIG. 7, there is shown a schematic view of a specific command in another embodiment of the present invention. In this embodiment, a new specific command 495 not limited to the specification of memory command is created, and the specific command 495 can be further represented a vendor specific command (Vendor Specific Command). The vendor specific command 495 directly includes a first (old) logic sector address (L_A), a second (new) logic sector address (L_B) and an accessible data length, which does not show the specific command identification code in the prior embodiments. After the data storage system 30 receiving the command transmitted by host system 40, it can directly identify a vendor specific command 495 and execute data reading and data moving. The first logic sector address (L_A) and the accessible data length 4955 pointing to the stored data (D_A) stored in the physical storage unit 351 are read and duplicated to memory buffer 45, and the physical storage address (B1, P0) with the stored data DA is moved for pointing to the second logic sector address (L_B).

The specific command 495 of the present invention can automatically execute data reading and data moving programs. When the user wants to read the stored data (D_A) in the physical storage memory 35 and move the stored data (D_A) to another new logic sector address (L_B) at the same time, it can be achieved by transmitting the specific command 495. In the conventional data storage system, it must receive two single read command and move command, then executing two programs of reading and moving, or receive three single commands of reading, writing and deleting, then executing programs of reading, writing and deleting. Only receiving a specific command provided by the present invention can automatically execute two programs of reading and moving. Therefore, the present invention can reduce the input/output delay and writing times in the data storage system in order to improve the efficiency and lifetime.

The data storage system and specific command execution method thereof of the present invention are also suitable for the RAID system having parity bit check (parity) function such as RAID4, RAID5 or RAID6. When the host system 40 reads the stored data D_A corresponding and pointing to the first logic sector address L_A, the stored data D_A is moved to another second logic sector address L_B under the specific command 495 of read-move transmitted by the present invention. When the memory manager 39 receives an command, it can judge whether the command is a normal command or a specific command. And, the memory manager 39 will control and perform the followings:

(a) The specific command 495 includes a first logic sector address L_A, an accessible data length and a second logic sector address L_B data. Therefore, read and duplicate the stored data D_A to the memory buffer 45, and move the physical storage address (B1, P0), which the first logic sector address L_A is originally pointing to, to be pointed by the second logic sector address L_B; (b) Read the parity check bit block data P_A of RAID data stripe S_A corresponding to the first logic sector address L_A to the memory buffer 45; (c) Read the stored data D_B of the second logic sector address L_B to the memory buffer 45; (d) Read the parity bit check block data P_B of RAID data stripe S_B corresponding to the second logic sector address L_B to the memory buffer 45; (e) Calculate (such as XOR operation) the new parity bit check block data P_A2 of first logic sector address L_A by the stored data D_A, parity bit check block data P_A and a blank data; (f) Calculate (such as XOR operations) the new parity bit check block data P_B2 of the logic sector address L_B by the stored data D_B, parity bit check block data P_B and the stored data D_A; (g) Write the new parity bit check data P_B2 temporarily stored in the memory buffer 45 to the parity bit check block of RAID data stripe S_B; (h) Delete or set the stored data D_A in the logic sector address L_A invalid; and (i) Write the new parity bit check data P_A2 temporarily stored in the memory buffer 45 to the parity bit check block of RAID data stripe S_A.

Compared to the read command and move command of the conventional RAID system having parity bit check (parity) function, the present invention can reduce once transmitting read command, and also once data writing (D_A writes to L_B). Therefore, the present invention can reduce the input/output delay and writing times in the data storage system in order to improve the efficiency and lifetime.

The present invention is specially applied to the RAID having log (Log-Based), copy-on-write (COW) or a general RAID having log or copy-on-write system. The target address (second logic sector address L_B) of data moving in these file systems is blank block, and the source address (first logic sector address L_A) is set invalid after data moving. When host system 40 reads the stored data D_A corresponding to the first logic sector address L_A, and the stored data D_A is moved to another second logic sector address L_B under the specific command 495 of read-move transmitted by the present invention. The host system 40 and/or the memory manager 39 will control and perform the followings: (a) The specific command 495 already includes the first logic sector address L_A, the accessible data length and the second logic sector address L_B data. Therefore, read and duplicate the stored data D_A to the memory buffer 45, and move the physical storage address (B1, P0), which the first logic sector address L_A is originally pointing to, to be pointed by the second logic sector address L_B; (b) Read the parity bit check block data P_B of RAID data stripe S_B corresponding to the second logic sector address L_B to the memory buffer 45; (c) Calculate (such as XOR operation) the new parity bit check block data P_B2 of the second logic sector address L_B by the stored data D_B (blank data), parity bit check block data P_B and the stored data D_A; (d) Write the new parity bit check data P_B2 temporarily stored in memory buffer 45 to parity bit check block of disc array data stripe S_B.

Compared to the read command and move command of the conventional RAID system having parity bit check (parity) function, the present invention can reduce once transmitting read command, and can also omit four steps as the followings: (b) Read and duplicate the parity bit check block data P_A of first logic sector address L_A, (c) Read and duplicate the stored data D_B corresponding to the second logic sector address L_B, (e) Calculate the new parity bit check block data P_A2 of the first logic sector address L_A and (j) Set the physical storage address, which the first logic sector address L_A is pointing to, invalid. It can reduce six steps of twice reading (P_A and D_B), twice writing (D_A and P_A2), once deleting (L_A) and once calculating operation (P_A2). Therefore, the present invention can reduce the input/output delay and writing times in the data storage system in order to improve the efficiency and lifetime.

Only those described above, only the preferred embodiment of the present invention only, not intended to limit the scope of the implementation of the present invention. That is where the scope of the application under these characteristics and spirit of the invention or modifications and alterations of whom shall be included within the scope of the invention patent.

What is claimed is:

1. A data storage system comprising:
   at least one physical storage memory being divided into a plurality of physical storage units, wherein each physical storage unit has a physical storage address, and a data is stored within part of the physical storage units;
   a plurality of logic sector addresses, wherein part of the logic sector addresses point to one of the physical storage addresses by a logic-physical address mapping table; and
   a memory manager electrically connecting to a host system, the physical storage memory and the logic sector address, wherein the memory manager can receive a command that comprises a normal command or a specific command from the host system, wherein the specific command comprises a specific command identification code, a first logic sector address, an accessible data length and a second logic sector address, and the memory manager checks whether the command has the specific command identification code or not;
   wherein as the memory manager determines the command having the specific command identification code, the memory manager can read the data stored in a first physical storage address according to the first logic sector address and the accessible data length, and duplicate the data stored in a first physical storage address to a memory buffer according to the specific command, and then change the logic sector address of the physical storage address from the first logic sector address to the second logic sector address.

2. The data storage system as of claim 1, wherein the move of data to the second logic sector address is by the memory manager modifying the logic-physical address mapping table, and the logic sector address, which is the physical storage address of the data pointing to, is modified as the second logic sector address from the first logic sector address.

3. The data storage system as of claim 1, wherein the normal command comprises a read command, which comprises an accessible data starting address and the accessible data length, and the specific command is to modify the accessible data starting address as a combination of the specific command identification code, the first logic sector address and the second logic sector address.

4. The data storage system as of claim 1, wherein the normal command comprises a read command having an accessible data starting address and the accessible data length, and the specific command is to modify the accessible data starting address as a combination of the specific command identification code and the first logic sector address, and the second logic sector address in the specific command is stored in the memory buffer.

5. The data storage system as of claim 1, wherein the memory buffer is disposed in the data storage system or the host system.

6. A specific command execution method, which is applied to a data storage system, the data storage system comprises at least one physical storage memory, a plurality of logic sector addresses and a memory manager, the physical storage memory is divided into a plurality of physical storage units, and each physical storage unit has a physical storage address, part of the physical storage units store a data, part of the logic sector addresses are pointing to correspondingly one of the physical storage addresses by a logic-physical address mapping table, and the memory manager respectively electrically connects to the physical storage memory and logic sector address, the specific command execution method comprising:
   receiving a command by the memory manager, wherein the command comprises a normal command or a specific command that includes a specific command identification code, a first logic sector address, an accessible data length and a second logic sector address;
   checking whether the command has the specific command identification code or not by the memory manager;
   reading the first logic sector address, the accessible data length and the second logic sector address in the specific command by the memory manage, if the memory manager determines the command having the specific command identification code;
   reading the data stored in a first physical storage address according to the first logic sector address and the accessible data length;
   duplicating the data stored in a first physical storage address to a memory buffer; and
   changing the logic sector address of the physical storage address from the first logic sector address to the second logic sector address.

7. The specific command execution method as of claim 6, wherein the move of data to the second logic sector address is by the memory manager modifying the logic-physical address mapping table, and the logic sector address, which is the physical storage address of the data pointing to, is modified as the second logic sector address from the first logic sector address.

8. The specific command execution method as of claim 6, wherein the normal command comprises a read command, which comprises an accessible data starting address and the accessible data length, and the specific command is to modify the accessible data starting address as a combination of the specific command identification code, the first logic sector address and the second logic sector address.

9. The specific command execution method as of claim 6, wherein the normal command comprises a read command having an accessible data starting address and the accessible data length, and the specific command is to modify the accessible data starting address as a combination of the specific command identification code and the first logic sector address, and the second logic sector address in the specific command is stored in the memory buffer.

10. A specific command execution method, which is applied to a RAID (Redundant Array of Independent Drives) system, the RAID system is a log mode or a copy-on-write mode, the RAID system comprises at least one physical storage memory, a plurality of logic sector addresses and a memory manager, the physical storage memory is divided into a plurality of physical storage units, and each physical storage unit has a physical storage address, part of the physical storage units store a data, part of the logic sector addresses are pointing to correspondingly one of the physical storage addresses by a logic-physical address mapping table, and the memory manager respectively electrically connects to the physical storage memory and logic sector address, the specific command execution method comprising:
   receiving a command by the memory manager, wherein the command comprises a normal command or a specific command that includes a specific command identification code, a first logic sector address, an accessible data length and a second logic sector address;
   checking whether the command has the specific command identification code or not by the memory manager;

reading the first logic sector address, the accessible data length and the second logic sector address in the specific command by the memory manage, if the memory manager determines the command having the specific command identification code;
reading the data stored in a first physical storage address according to the first logic sector address and the accessible data length;
duplicating the data stored in a first physical storage address to a memory buffer;
changing the logic sector address of the physical storage address from the first logic sector address to the second logic sector address;
reading a second parity bit check block data of a second RAID data stripe corresponding to the second logic sector address to the memory buffer;
calculating a second new parity bit check block data of the second logic sector address by a blank data, the second parity bit check block data and the data; and
writing the second new parity bit check block data to the second parity bit check block of the second RAID data stripe.

* * * * *